(12) United States Patent
Schauer et al.

(10) Patent No.: US 9,745,757 B2
(45) Date of Patent: Aug. 29, 2017

(54) REMOVABLE SURFACE COVERING

(71) Applicants: Etienne Schauer, Freylange (BE); Richard Peres, Millau (FR)

(72) Inventors: Etienne Schauer, Freylange (BE); Richard Peres, Millau (FR)

(73) Assignee: Tarkett GDL S.A., Lentzweiler (LU)

( * ) Notice: Subject to any disclaimer, the term of this patent is extended or adjusted under 35 U.S.C. 154(b) by 12 days.

(21) Appl. No.: 14/704,456

(22) Filed: May 5, 2015

(65) Prior Publication Data

US 2015/0233128 A1   Aug. 20, 2015

Related U.S. Application Data

(63) Continuation of application No. 13/126,377, filed as application No. PCT/EP2009/064077 on Oct. 26, 2009, now abandoned.

(30) Foreign Application Priority Data

Oct. 28, 2008   (EP) .................................... 08167686

(51) Int. Cl.
| | | |
|---|---|---|
| *E04F 13/07* | (2006.01) | |
| *E04F 13/08* | (2006.01) | |
| *E04F 13/09* | (2006.01) | |
| *E04F 15/18* | (2006.01) | |
| *E04F 15/22* | (2006.01) | |
| *B29C 65/48* | (2006.01) | |
| *B29C 65/52* | (2006.01) | |
| *B32B 37/14* | (2006.01) | |
| *B32B 37/12* | (2006.01) | |
| *B32B 37/18* | (2006.01) | |
| *B32B 38/10* | (2006.01) | |
| *B32B 38/18* | (2006.01) | |
| *E04F 15/10* | (2006.01) | |
| *E04F 15/04* | (2006.01) | |

(52) U.S. Cl.
CPC .......... *E04F 15/105* (2013.01); *E04F 15/043* (2013.01)

(58) Field of Classification Search
USPC .................................. 156/71, 247, 701, 714
See application file for complete search history.

(56) References Cited

U.S. PATENT DOCUMENTS

| | | | |
|---|---|---|---|
| 3,341,996 A | 9/1967 | Jones et al. | |
| 7,194,843 B2 | 3/2007 | Pacione | |
| 8,669,311 B2 | 3/2014 | Colle et al. | |
| 2003/0070391 A1* | 4/2003 | Tachauer | A44B 18/0049 52/745.21 |
| 2003/0144469 A1* | 7/2003 | Kauffman | C08J 7/045 528/480 |

(Continued)

FOREIGN PATENT DOCUMENTS

| | | | | |
|---|---|---|---|---|
| AU | WO 9119445 A1 * | 12/1991 | ......... | A47G 27/0437 |
| FR | 2350445 A | 12/1977 | | |
| FR | 2362257 A1 | 3/1978 | | |

*Primary Examiner* — Sing P Chan
(74) *Attorney, Agent, or Firm* — Reinhart Boerner Van Deuren P.C.

(57) ABSTRACT

The present invention describes a floor decoration kit comprising two elements, on the one hand a removable surface covering (2) and on the other an anchoring sublayer (3) while the composition of said anchoring sublayer (3) is PVC-based and comprises at least 60% by weight of a plasticizer.

18 Claims, 2 Drawing Sheets

(56) References Cited

U.S. PATENT DOCUMENTS

| | | | |
|---|---|---|---|
| 2003/0162892 A1* | 8/2003 | Maier | C08G 18/0823 |
| | | | 524/839 |
| 2004/0138328 A1 | 7/2004 | Kohr et al. | |
| 2006/0048464 A1 | 3/2006 | Suzuki et al. | |
| 2006/0156663 A1 | 7/2006 | Mao | |
| 2007/0037926 A1* | 2/2007 | Olsen | C08K 5/12 |
| | | | 524/569 |
| 2008/0010930 A1 | 1/2008 | Mao | |

* cited by examiner

REMOVABLE SURFACE COVERING

CROSS-REFERENCE TO RELATED PATENT APPLICATIONS

This patent application is a continuation of co-pending Parent application Ser. No. 13/126,377, filed Jun. 23, 2011, which is a 371 international of PCT/EP2009/064077, filed Oct. 26, 2009, which claims priority to European Application No. 08167686.8, filed Oct. 28, 2008, the entire teachings and disclosure of which are incorporated herein by reference thereto.

SCOPE OF INVENTION

This invention refers to removable surface coverings, in particular removable floor surface coverings, and proposes a solution related to the laying of such coverings.

STATE OF THE ART

For interior or exterior decoration of a building or dwelling, general use is of surface coverings, in particular floor coverings, because they are more agreeable, better looking and more comfortable than a bare or simply painted surface. Generally, the floor coverings are of synthetic material, wood or textile. Normally, synthetic multilayer floor coverings are used, comprising on the one hand a lower layer, called the support layer, and on the other an upper layer, referred to as the wear layer, offering good resistance to the mechanical and chemical aggression bearing upon it under normal working conditions of such coverings.

Generally, laying a floor covering means using a strong glue which is previously spread over the surface to be covered. This produces high stability of the covering over the surface. But when a floor covering has to be replaced, it is very difficult to detach and generally, many traces of glue and/or floor covering remain and have to be eliminated either by physical stripping (such as by scraping) or by chemical stripping. The surface must then be smoothed again and cleaned so that a new covering can be laid. Generally, this laying technique does not allow the removal, replacement or changing of the floor covering or certain elements of that covering without damaging or deteriorating it, resulting in it being rendered unusable.

To offer a removable floor covering, it has been proposed not to definitively stick the covering down onto the surface to be covered but to use strips of double-sided adhesive tape or a general purpose fixative. However, these solutions are time-consuming and unadvisable when two or several widths are laid because the joints are not absolutely tight. In addition, in the same way as for conventional adhesive, double-sided adhesives or general-purpose fixative have the drawback of deteriorating in time under the effect of damp and the repeated cleaning of the covering.

To avoid using adhesive or glue, an alternate solution known as "floating floor" consists in using tiles or laths, generally of wood, attached together by a mechanical attaching device, clips or glue. This type of covering offers good resistance to traffic in the course of time and leaves the surface it covers free of glue. Nevertheless, once laid, a floating floor has the drawback of being in one piece and therefore of not allowing one or several of its component parts to be replaced.

To address the problem of laying a reusable removable floor covering, whose application does not damage the surface it covers, documents U.S. Pat. No. 3,341,996 and FR 2350445 propose the use of magnetized particles. Document FR 2350445 proposes the application of a magnetizable mastic to the surface to be decorated or to the surface of a covering, and of applying to the surface which will come into contact with the surface to be decorated, or the surface of the covering, a binder containing iron powder. Document U.S. Pat. No. 3,341,996 describes a floor covering including a sublayer containing magnetic fillers on which a decorative layer is laid, also containing magnetic fillers. Nevertheless, one of the issues encountered with this type of covering is the lack of stability of the tiles with respect to each other in all the different directional planes. When traffic is heavy, tiles, laths or covering widths move with respect to one another.

In document U.S. Pat. No. 7,194,843, it has been proposed to use a sublayer the upper face of which includes hooks, of the "fishhook" type, and a decorative covering the lower face of which includes small plastic loops. When the two sides are pressed against each other, the hooks catch on the loops and hold the two layers in contact, in the same way as self-attaching strips of the Velcro™ type. The greater the pressure applied, the tighter the hooks grip the loops; accordingly, the resilience of this type of covering represents a major drawback because heavy items, for instance pieces of furniture, leave marked and indelible signs of crushing. Furthermore, the force required to remove the decorative part of the covering is often so great that removal frequently results in the lifting away or the detaching of the sublayer. In addition, after the frequent laying and removal of the decorative parts, the hooks and/or loops lengthen or break, reducing the quality of attachment in the course of time.

In addition, all the previously described solutions have the drawback of not only being very costly to produce, but also of requiring a specific manufacturing process.

PURPOSES OF INVENTION

This invention proposes a solution for surface decoration, in particular a floor surface, which does not have the drawbacks of the prior art.

It aims at supplying a low-cost removable surface covering which is easy to lay.

In particular, it aims at supplying a surface covering the decorative part of which is removable and can be modified as desired without causing any damage or altering the decorative part and/or the covered surface of the decorative part.

It also aims at supplying a surface covering whose decorative part, while being removable, offers dimensional stability too.

SUMMARY OF INVENTION

The present invention describes a floor decoration kit including two elements, on the one hand a removable surface covering and on the other an anchoring undercoat while the composition of said anchoring sublayer is PVC-based and comprises at least 60% by weight of a plasticizer.

According to the particular production embodiments, the surface covering according to the invention comprises one or any suitable combination of one or several of the following characteristics:

the anchoring sublayer is to be laid on the floor to be covered, the removable surface covering being laid on said anchoring sublayer, the plasticizer is chosen from the group consisting of phthalates, adipates, trimellitates, organophosphates, citrates, vegetable oils and polyol esters derived from starch, or their mixture, the plasticizer is chosen from the group formed by di-isobutylphthalate, di-isoheptylphthalate, di-isononyl-phthalate, or their mixture, the attaching sublayer comprises reinforcing fillers and/or a glass mat, the anchoring sublayer is at least 0.25 mm thick, the removable surface covering is based on polymer resin, rubber, wood, textile, glass, metal or ceramic, the removable surface covering is based on PVC or on medium density wood fiber (MDF) or on high density wood fiber (HDF), the removable surface covering is a multilayer product of polymer resin comprising a supporting layer which is foam, compact or textile, and incorporates a wear layer, the removable surface covering also includes a barrier layer placed between the supporting layer and the wear layer, the removable surface covering also includes protection varnish based on polyurethane, crosslinkable by UV, the removable surface covering, on the surface coming into contact with the anchoring sublayer, is a PVC-based tackifying coating comprising at least 60% by weight of a plasticizer.

The present invention also describes a process for attaching a removable decorative surface covering, comprising the use of an anchoring sublayer, said sublayer being laid on the floor to be covered, and having a composition based on PVC comprising at least 60% by weight of a plasticizer.

According to the particular production embodiments, the process according to the invention includes one or any suitable combination of one or several of the following characteristics:

the anchoring sublayer is laid on the floor before the laying of the removable surface covering on said anchoring sublayer, the anchoring sublayer covers the floor to be covered continuously, the removable decorative surface covering, on the surface which will come into contact with the anchoring sublayer, has a tackifying coating based on PVC comprising at least 60% by weight of a plasticizer.

DETAILED DESCRIPTION OF THE INVENTION

A surface covering, in particular a floor covering, has particular mechanical properties especially in terms of mechanical strength, hardness and resistance to wear, but also in terms of comfort, flexibility and sound and heat insulation.

Floor decoration kit 1 according to the invention combines the advantages of a conventional floor covering with the advantage of being interchangeable and reusable.

Decoration kit 1 includes two separate elements, that is, removable surface covering 2 and anchoring sublayer 3. The anchoring sublayer is a composition based on highly plasticized PVC. It has an adhesive effect, also called a tackifying effect. It may be soft or more or less gelatinous. Preferably, the anchoring sublayer 3 comprises at least 60% by weight of a plasticizer.

Figure 1:
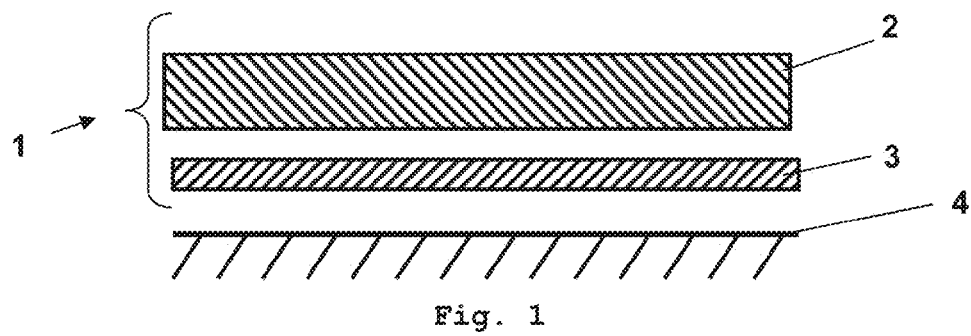
FIG. 1 is a schematic representation of the floor covering kit.
Figure 2:
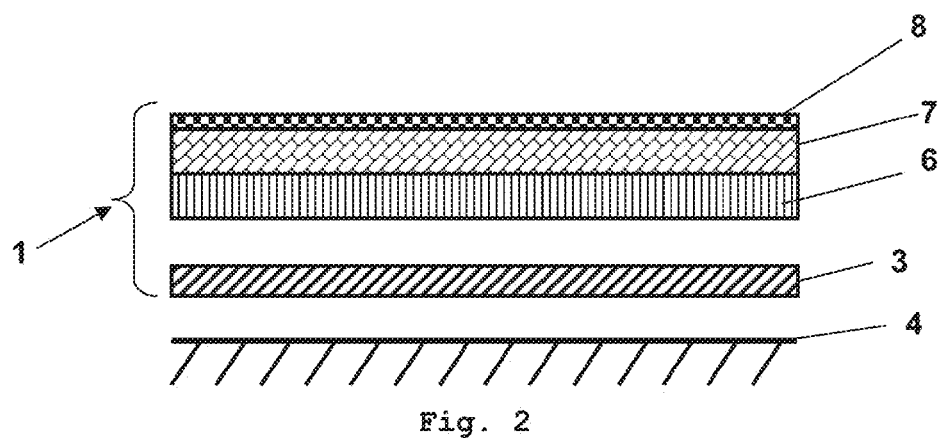
FIG. 2 is a schematic representation of the floor covering kit in which the removable surface covering is a multilayer product.
Figure 3:
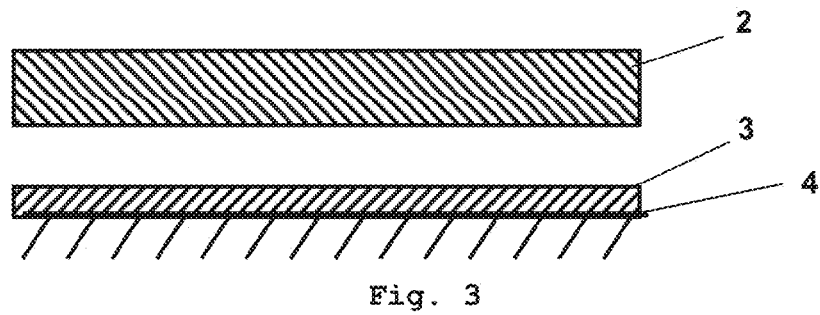
FIG. 3 represents a transversal section of a removable surface covering according to the first embodiment of the invention.

In an initial embodiment of the invention (FIGS. 1 to 3), the anchoring sublayer 3 is laid on floor 4 before the removable decorative surface covering 2 is laid on the anchoring sublayer 3.

Figure 4:
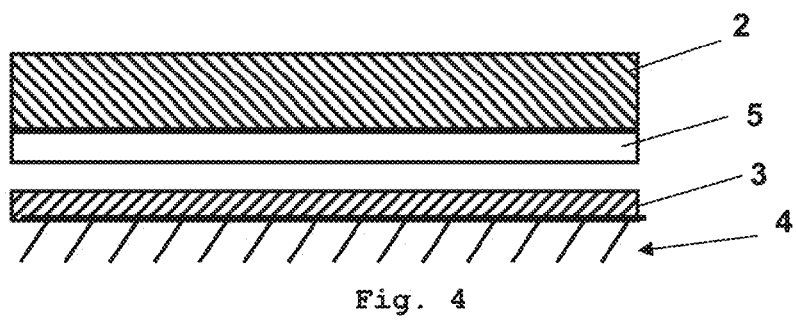
FIG. 4 represents a transversal section of a removable surface covering according to a second embodiment of the invention.
Figure 5:
FIG. 5 represents a transversal section of an anchoring sublayer on release paper.

In a second embodiment of the invention (FIG. 4), the anchoring sublayer 3 is laid on the floor 4 and comes into contact with tackifying coating 5 covering the lower surface (or back) of the removable decorative surface covering 2.

In all the embodiments of the invention, the removable decorative surface covering 2 is held in place by the adhesive effect of the highly plasticized anchoring sublayer 3.

The anchoring sublayer 3 laid on the floor to be covered can be attached permanently by any suitable means or impermanently by the adhesive effect of said anchoring sublayer 3. The anchoring sublayer 3 is laid on the floor to be covered continuously or discontinuously.

The anchoring sublayer 3 is a composition based on highly plasticized PVC. It contains at least 60% by weight, preferably at least 66% by weight, of a plasticizer or a mixture of plasticizers.

Preferably, the plasticizer is chosen from the family of phthalates, adipates, trimellitates, citrate organophosphates, vegetable oils and natural polyol esters derived from starch, for instance, isosorbide diester.

Preferably, the plasticizer is DIBP (Di-isobutylphthalate), DIHP (Di-isoheptylphthalate) or DINP (Di-isononylphthalate) or a mixture of these compounds. It can also be of epoxy-additivated soya oil or castor oil.

Figure 6:
FIG. 6 represents a transversal section of an anchoring sublayer comprising a glass mat.
Figure 7:
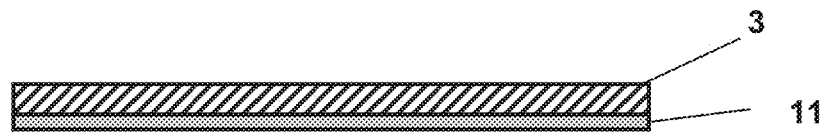
FIG. 7 represents a transversal section of an anchoring sublayer comprising a PVC-based compact layer.
Figure 8:
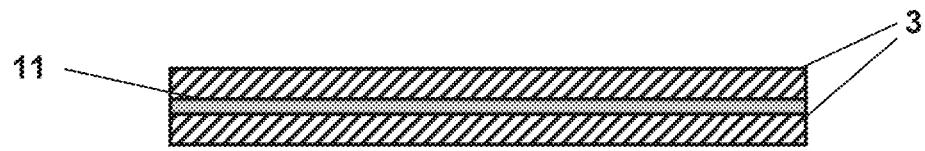
FIG. 8 represents a transversal section of another embodiment of an anchoring sublayer including a compact layer.

Generally speaking, the anchoring sublayer 3 is a PVC-based composition including at least 60% by weight of a plasticizer. Nevertheless, it can also offer some structural rigidity which can be obtained by the use of fillers, in particular reinforcing fillers such as, for instance, calcium carbonate, kaolin or talcum powder or the use of the glass mat (FIG. 6) or a compact layer based on PVC (FIG. 7). In these cases, the highly plasticized PVC-based composition is applied either to one side only, or to both sides of the glass mat 10 or of the compact layer 11 (FIG. 8). In one particular embodiment, the anchoring sublayer includes a compact layer 11 based on PVC to which a glass mat is applied and to which the highly plasticized PVC-based composition is then applied.

The tackifying coating 5 is any suitable coating. Preferably, it will be a highly plasticized PVC-based composition including at least 60% by weight of a plasticizer or a mixture of plasticizers. Preferably, the plasticizer is DIBP (Di-isobutylphthalate), DIHP (Di-isoheptylphthalate) or DINP (Di-isononylphthalate) or a mixture of these compounds. It can also be epoxy-additivated soya oil or castor oil.

The tackifying coating 5 can be applied continuously or discontinuously to removable decorative surface covering 2 in any suitable manner. Preferably, tackifying coating 5 will first be applied to a suitable support, or applied directly to removable surface covering 2 by application in liquid form, then gelified by the effect of heat, for instance, by placing it in an oven at between 150 and 200° C., advantageously at 180° C., for approximately 2 min. For a removable surface covering 2 of wood fiber-based panels, the tackifying coating 5 is applied to nonstick paper (release paper) then applied to the removable surface covering 2 using any suitable adhesive, for instance, an acrylic or hotmelt adhesive based on EVA.

Preferably, the tackifying coating 5 forms a layer at least 0.25 mm thick, advantageously between 0.25 and 0.5 mm.

In every embodiment of the invention, the removable surface covering 2 according to the invention can be any suitable surface covering element of any suitable shape, color and material.

The removable surface covering 2 can be based on polymer resin, rubber, wood, textiles, glass, metal or ceramic, For instance, it can consist of laminates, high density particle wood boards (HDF) or medium density particle wood boards (MDF) comprising a decorative melamine paper (wood or other print) and a backing paper. It can also be a surface covering such as linoleum. In another example, it could be a multilayer product of polymer resin comprising a support layer 5 which is foamed, compact or textile, and a wear layer 6 of polymer resin, possibly covered by a coating of protective varnish 8 (FIG. 2), said varnish 8 which can be based on polyurethane crosslinkable by ultraviolet light (UV).

In particular, the removable surface covering 2 is a PVC-based multilayer product comprising a support layer 6 and/or a wear layer 7 based on PVC and a protection varnish 8 based on polyurethane. Advantageously, the support layer 6 and/or wear layer 7 of the removable surface covering 2 comprise a glass mat or fillers, preferably mineral fillers, designed to endow it with particular mechanical properties. The mineral fillers can be, for instance, calcium carbonate, kaolin or talcum powder.

The removable surface covering 2 can also comprise a barrier layer preventing or reducing the rising of the plasticizer from anchoring sublayer 3 to the upper part of the removable surface covering 2. Preferably, said barrier layer will be arranged between support layer 6 and wear layer 7. Preferably, the barrier layer will be a polyester-based film.

In a preferred embodiment of the invention, the decorating kit 1 comprises an anchoring sublayer 3 and a removable surface covering 2 which is a PVC-based multilayer product covered with a protection varnish 8 and a tackifying coating 5 continuously covering the surface of removable covering 2 which comes into contact with anchoring sublayer 3.

For a removable surface covering 2 in the form of laths or tiles, it has become apparent that the rigidity of sublayer 3 increases the dimensional stability of the tiles or laths with respect to one another. The use of sublayer 3 has a self-locking effect on the removable surface covering 2. Accordingly, being exposed to traction stresses, the tiles or laths offer better horizontal stability, preventing gaps from appearing between sections of the removable surface covering 2, thus rendering the entire covering stronger and more stable to traffic, without recourse to the use of a grouting product between the tiles or laths.

The adherence of the removable surface covering 2, possibly coated with a tackifying coating 5, has been assessed (table 1) by a test consisting in determining the force to be applied to the surface covering 2 for it to detach from a fixed support, or from anchoring sublayer 3, attached permanently to the fixed support.

The influence of the presence of a tackifying coating 5 on the hardness of the covering has also been assessed (table 1) by indentation, or punching, measurements made according to standard EN433. A 50 kg weight is applied to a punch measuring 1 cm$^2$. After 150 min. under load and 150 min. of rest, the depth of the impression left by the punch is measured.

TABLE 1

| | Upper part/ undercoat | % of plasticizer | Gelification temperature (° C.) | Gel thickness (mm) | Indentation (mm) | Strength (N) |
|---|---|---|---|---|---|---|
| 1 | w/o gel/ with gel | 60 | 155 | 0/0.5 | 0.03 | 0.49 |
| 2 | with gel/ with gel | 66 | 180 | 0.25/0.25 | 0.09 | 41.20 |
| 3 | with gel/ w/o gel | 60 | 155 | 0.5/0 | 0 | 19.62 |
| 4 | with gel/ w/o gel | 66 | 180 | 0.25/0 | 0.04 | 20.40 |

Surprisingly, when combinations 1 and 3 of table 1 are compared, it appears that tackifying coating 5 applied to the surface covering 2 (combination 3) offers better adherence of said removable covering 2 on the floor compared to the situation in which an anchoring sublayer 3 is applied to the floor (combination 1). In addition, by comparing combinations 2 and 4, it appears that the most advantageous situation is a surface covering comprising a tackifying coating 5 combined with an anchoring sublayer 3.

During the adherence tests, it also appeared that adherence increases according to the pressure applied to the removable surface covering 2 so that it adheres to the anchoring sublayer 3 previously laid on the floor. The greater the pressure, the better the adherence. Accordingly, regarding a floor covering, the greater the traffic on removable part 2, the more said removable part 2 adheres to anchoring sublayer 3, previously laid on the floor.

In addition to the fact that the solution for surface decoration according to the invention has the advantage of being easy to apply, without the use of adhesive, on one or several elements of a surface covering, it also offers the advantage of allowing great freedom and choice of decor and allows a combination of various removable decorative coverings of different types (polymer resin, wood, rubber, metal, ceramic) and allows easy replacement of one or several elements of the removable section 2, while preserving the adhesive strength of anchoring sublayer 3.

The use of anchoring sublayer 3, previously covering the floor to be decorated, offers the additional advantage of producing a plane surface even if the surface to be covered contains irregularities.

In addition, the removable surface covering 2 and/or the anchoring sublayer 3 can be regenerated and reusable to infinity because once washed, anchoring sublayer 3 recovers its self adhesive or tackifying property.

The anchoring layer 3 also offers the advantage of reducing sound transmission between the outer surface of the surface covering and the surface to be covered.

EXAMPLES

Example 1

The removable surface covering is a panel based on high density wood fiber board HDF (Smart original by Tarkett) 7 mm thick, including a tackifying coating 0.5 mm thick, containing 17.6% of P1353K Vestolit® PVC, 15.4% of fillers (CaCO$_3$ Durcal® 15 from OMYA) 62% of DINP Jayflex® by Exxon and 0.37% of a rheological agent (Aerosil® 200 by EVONIK). The tackifying coating is applied to the removable covering by means of a TESA® 4970 adhesive and a nonstick paper (release paper by Stipkote EHR.C1.S.EX flat from SAPPI Europe) coated with a highly plasticized PVC-based composition, gelified by warming in an oven at 180° C.

Example 2

The removable surface covering is a PVC multilayer product 2.5 mm thick, including a tackifying coating 0.5 mm thick, containing 17.6% of P1353K Vestolit® PVC, 15.4% of fillers (CaCO$_3$ Durcal® 15 from OMYA) 62% of DINP Jayflex® by Exxon and 0.37% of a rheological agent (Aerosil® 200 by EVONIK). The tackifying coating applied to the removable covering is a liquid, then gelified by being placed in an oven at 155° C. The PVC-based multilayer removable covering (Tarkett Stone 370) comprises a foam back, a rolled sublayer of 600 g/m² based on recycled PVC containing a saturating glass mat of 80 g/m², a layer of finishing foam and a varnish based on polyurethane measuring 10 μm.

Example 3

The removable surface covering is as described in example 2. The floor is covered with an anchoring sublayer comprising a glass mat coated on both sides with a composition made up of 17.6% P1353K Vestolit® PVC, 15.4% of fillers (CaCO$_3$ Durcal® 15 from OMYA) 62% of DINP Jayflex® from Exxon and 0.37% of a rheological agent (Aerosil® 200 from EVONIK); then the composition is gelified by being put in an oven at 155° C. The removable surface covering is positioned on the anchoring sublayer previously laid on the floor.

Example 4

Example 4 is identical to example 3 with the exception of the gelification of the anchoring sublayer covering the floor, and the gelification of the tackifying coating, obtained by placing it in an oven at 180° C.

Example 5

Example 5 is identical to example 4 with the exception of the anchoring sublayer to be laid on the floor which comprises 13.5% P1353K Vestolit® PVC, 4.4% of Lacovyl® PA 1384 by Arkema, 15.4% of fillers (CaCO3 Durcal® 15 from OMYA) 66% of DINP Jayflex® by Exxon and 0.7% of a rheological agent (Aerosil® 200 by EVONIK).

Example 6

Example 6 is identical to example 5 except for the anchoring sublayer whose thickness becomes 0.25 mm.

Example 7

The removable surface covering is a covering according to example 2 covered with an anchoring sublayer including a compact PVC layer, including 12.4% Jayflex® DINP by Exxon, 12.9% of Vinnolit® P 4472 PVC, 16.1% of Vestolite® B 7021, 47% of CaCO$_3$ OMYA BL 20, 11.6% of Nonyl Benzoate. The compact PVC layer is covered on the side coming into contact with the removable surface covering with a composition including 17.6% P1353K Vestolit® PVC, 15.4% of fillers (CaCO$_3$ Durcal® 15 from OMYA) 62% of DINP Jayflex® by Exxon and 0.37% of a rheological agent Aerosil® 200 by EVONIK, applied in liquid form then gelified by placing in an oven at 155° C.

Example 8

The removable surface covering is a panel based on high density wood fiber board HDF (Smart original by Tarkett) 7 mm thick, without a tackifying coating and is based on the anchoring sublayer previously laid on the floor, said anchoring sublayer comprising 13.5% of P1353K Vestolit® PVC, 4.4% of Lacovyl® PA 1384 by Arkema, 15.4% of fillers (CaCO$_3$ Durcal® 15 from OMYA) 66% of DINP Jayflex® by Exxon and 0.7% or a rheological agent (Aerosil® 200 by EVONIK).

Example 9

The removable surface covering is a multilayer PVC product 2.5 mm thick, without a tackifying coating and is placed on the anchoring sublayer previously laid on the floor, said anchoring sublayer comprising 13.5% of P1353K Vestolit® PVC, 4.4% of Lacovyl® PA 1384 by Arkema, 15.4% of fillers (CaCO$_3$ Durcal® 15 from OMYA) 66% of DINP Jayflex® by Exxon and 0.7% of a rheological agent (Aerosil® 200 by EVONIK).

LEGEND

1: Decoration kit
2: Removable surface covering
3: Anchoring sublayer
4: Floor
5: Tackifying coating
6: Support layer
7: Wear layer
8: Protection varnish
9: Release paper

The invention claimed is:

1. A method of laying a removable decorative floor surface covering onto a floor comprising:
   providing a floor decoration kit comprising a removable surface covering and an anchoring sublayer as separate components, wherein said anchoring sublayer has a top surface and a bottom surface, and at least said top surface is formed by a soft layer of a highly plasticized PVC-based composition comprising at least 60% by weight of a plasticizer or of a mixture of plasticizers, such that said top surface shows an adhesive effect;
   laying the anchoring sublayer with said bottom surface onto the floor to be decorated and attaching the anchoring sublayer permanently to the floor; and
   removably attaching the removable surface covering to the anchoring sublayer by pressing it onto the top surface of the anchoring sublayer.

2. The method according to claim 1, wherein the plasticizer is chosen from the group consisting of phthalates, adipates, trimellitates, organophosphates, citrates, vegetable oils and polyol esters derived from starch or of a mixture thereof.

3. The method according to claim 1, wherein the plasticizer is chosen from the group consisting of di-isobutylphthalate, di-isoheptylphthalate, di-isononylphthalate, or of a mixture thereof.

4. The method according to claim 1, wherein the anchoring sublayer comprises fillers and/or a layer of glass.

5. The method according to claim 1, wherein the anchoring sublayer is at least 0.25 mm thick.

6. The method according to claim 1, wherein the removable surface covering is based on polymer resin, rubber, wood, textile, glass, metal or ceramic.

7. The method according to claim 1, wherein the removable surface covering is based on PVC, on medium density wood fiber (MDF) or on high density wood fiber (HDF).

8. The method according to claim 1, wherein the removable surface covering is a multi-layer product of polymer resin comprising a support layer and a wear layer, wherein the support layer is foamed, compact or textile.

9. The method according to claim 8, wherein the removable surface covering further comprises a barrier layer placed between the support layer and the wear layer.

10. The method according to claim 1, wherein the removable surface covering comprises a protection varnish based on polyurethane crosslinkable by ultraviolet light.

11. The method according to claim 1, wherein the removable surface covering comprises on a surface coming into contact with the anchoring sublayer a PVC-based tackifying coating comprising at least 60% by weight of a plasticizer.

12. The method according to claim 1, wherein the anchoring sublayer continuously covers the floor to be covered.

13. The method according to claim 12, wherein the removable surface covering is a flooring selected from the group consisting of laths, tiles and boards.

14. The method according to claim 1, wherein the removable surface covering is a flooring selected from the group consisting of laths, tiles and boards.

15. The method according to claim 1, wherein the removable surface covering is a flooring that is linoleum.

16. The method according to claim 1, further comprising:
    removing all or part of the removable surface covering attached to the anchoring sublayer, wherein the anchoring sublayer remains attached to the floor to be covered; and
    replacing the removed surface covering with a replacement removable surface covering, wherein the anchoring sublayer attached to the floor to be covered is reused for adhesive attachment of a replacement removable surface covering.

17. The method according to claim 16, wherein the anchoring sublayer continuously covers the floor to be covered, and the removable surface covering is a flooring selected from the group consisting of laths, tiles, boards and linoleum.

18. The method according to claim 1, wherein the bottom surface of the anchoring sublayer is formed by a highly plasticized PVC-based composition comprising at least 60% by weight of a plasticizer or of a mixture of plasticizers, such that said bottom surface shows an adhesive effect.

* * * * *